United States Patent [19]

Matsuo et al.

[11] Patent Number: 5,253,614
[45] Date of Patent: Oct. 19, 1993

[54] INTAKE SYSTEM FOR ENGINE

[75] Inventors: Noritaka Matsuo; Koichiro Takeuchi, both of Iwata; Tokuji Muramatsu, Hamakita, all of Japan

[73] Assignee: Yamaha Hatsudoki Kabushiki Kaisha, Iwata, Japan

[21] Appl. No.: 742,575

[22] Filed: Aug. 7, 1991

Related U.S. Application Data

[63] Continuation of Ser. No. 210,199, Jun. 20, 1988, abandoned, which is a continuation of Ser. No. 163,201, Jun. 25, 1980, abandoned.

[30] Foreign Application Priority Data

Jun. 27, 1979 [JP] Japan .................................. 54-81752

[51] Int. Cl.⁵ .............................................. F02B 27/00
[52] U.S. Cl. ................................. 123/52 M; 123/73 V
[58] Field of Search ............... 123/52 MB, 52 M, 308, 123/432, 52 MF, 73 V, 73 A, 73 R

[56] References Cited

U.S. PATENT DOCUMENTS

| | | | |
|---|---|---|---|
| 2,104,371 | 9/1935 | Barker | 123/52 M |
| 3,107,659 | 10/1963 | Steinlein et al. | 123/73 V |
| 3,687,118 | 8/1972 | Nomura | 123/73 R |
| 3,690,304 | 9/1972 | Schneider et al. | 123/73 V |
| 3,810,454 | 5/1974 | Hunt | 123/52 MF |
| 3,990,414 | 11/1976 | Malphettes | 123/52 MB |
| 4,194,474 | 3/1980 | Endo | 123/308 |
| 4,231,329 | 11/1980 | Ishida | 123/52 MB |
| 4,244,333 | 1/1981 | Matsumoto | 123/52 M |
| 4,254,746 | 3/1981 | Chiba et al. | 123/52 M |

FOREIGN PATENT DOCUMENTS 162083 4/1921 United Kingdom .............. 123/52 M

*Primary Examiner*—Andrew M. Dolinar
*Attorney, Agent, or Firm*—Ernest A. Beutler

[57] ABSTRACT

Several embodiments of engine intake systems that improve the charging efficiency by providing a closed branch passage which forms a volume in the intake tract between the throttle valve and the point of discharge into an engine chamber. The illustrated embodiments of the application of this concept is to both four and two cycle engines. In addition, a plenum chamber is illustrated for permitting the effective volume of the branch passage to be increased without unduly increasing its length. The branch passage outlet in certain embodiments is oriented so that its discharge during the intake cycle increases turbulence to improve combustion efficiency.

10 Claims, 3 Drawing Sheets

INTAKE SYSTEM FOR ENGINE

This is a continuation of U.S. patent application Ser. No. 210,199, filed Jun. 20, 1988, now abandoned, which is a continuation of U.S. patent application Ser. No. 163,201, filed Jun. 25, 1980, now abandoned.

BACKGROUND OF THE INVENTION

This invention relates to an intake system for an engine and more particularly to an intake system and method for improving the charging efficiency.

Most engines, be they two or four cycle and rotating or reciprocating, employ an intake passage that discharges into a variable volume chamber of the engine and a throttle valve for controlling the flow through the intake passage. Regardless of whether the engine is of the ported or valve type, flow pulsations occur in the intake passage which have the effect of reducing charging efficiency. These problems are particularly prevalent at low to medium engine speeds and/or throttle openings. When the engine intake valve or intake port is open, a charge flows into the chamber. When the valve or port is closed, the flow through the intake passage ceases and the air and charge in effect become stagnent. Thus, during the next opening of the engine valve or port, the inertia of the charge in the intake passage downstream of the throttle valve must be overcome before a charge is again delivered to the chamber. At low engine speeds and low throttle openings, this effect considerably reduces the charging efficiency of the engine. At higher engine speeds the flow in the intake passage becomes more uniform since the greater number of intake cycles in a given period of time causes a flow inertia to develop.

It is, therefore, a principle object of this invention to provide an intake system for an engine in which the charging efficiency, particularly at lower speeds and lower throttle openings, is improved.

It is another object of this invention to provide a method for improving the charging efficiency of an engine.

It is still another further object of this invention to provide a structure or method for improving the charging efficiency of an engine while permitting the maintenance of a compact construction.

It is a further object of this invention to provide a method and structure for the intake system of an engine which not only improves charging efficiency but which also can induce turbulence to the charge introduced to the engine so as to improve combustion efficiency.

SUMMARY OF THE INVENTION

This invention is adapted to be embodied in an induction system for an internal combustion engine having a chamber of variable volume, an intake passage for delivering a charge to the chamber and throttle means for controlling the flow to the chamber through the intake passage. In conjunction with the invention a branch passage is provided that communicates with the intake passage between the throttle means and the chamber for providing a closed volume in communication with the intake passage for improving induction efficiency.

Another feature of the invention is adapted to be embodied in a method for operating an internal combustion engine having a chamber and intake passage and throttle valve means as set forth in the immediately preceding paragraph. In conjunction with this feature, the method includes a step of providing a volume in communication with the intake passage between the throttle valve and the chamber through a restricted opening for improving induction efficiency.

DETAILED DESCRIPTION OF THE PREFERRED EMBODIMENTS

Figure 1:
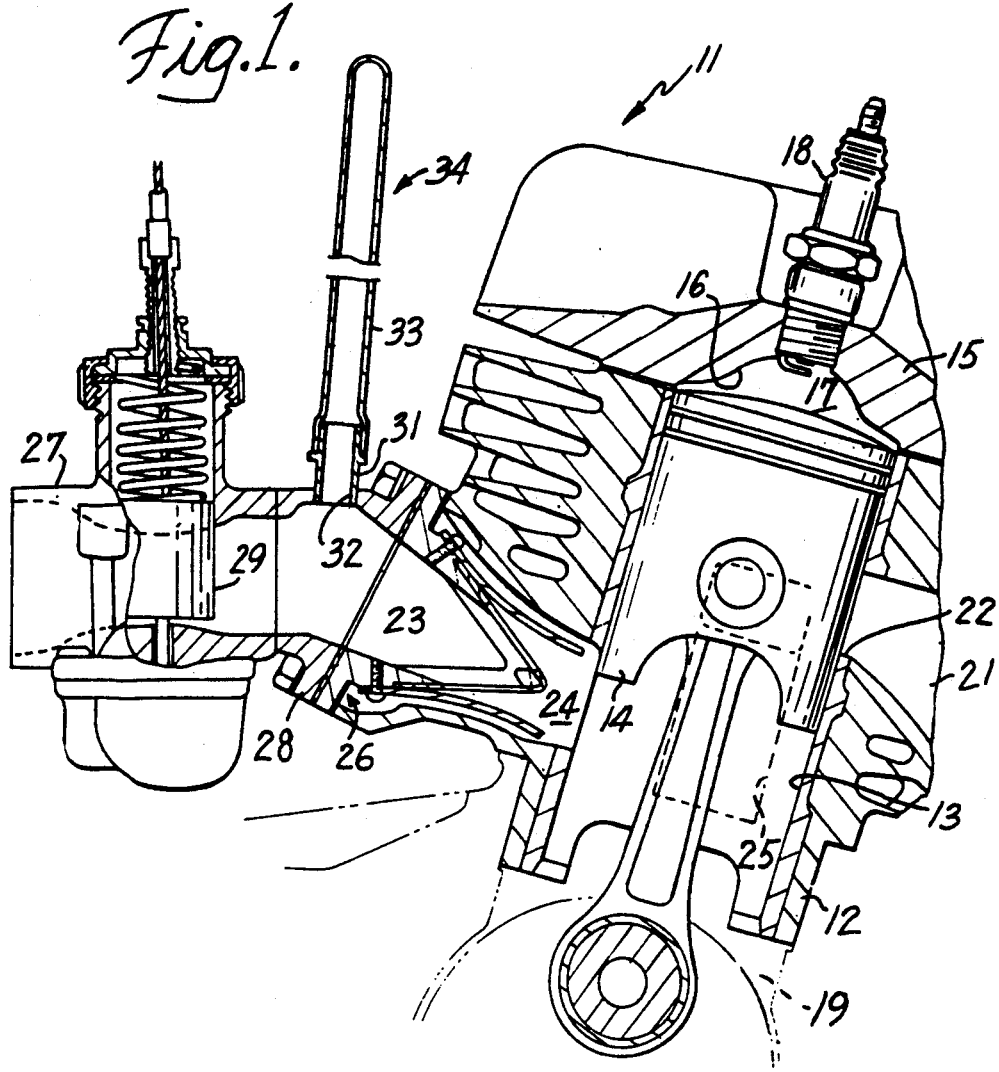
FIG. 1 is a partial cross-sectional view taken through a single cylinder of a two-cycle engine constructed in accordance with a first embodiment of the invention.

FIG. 1 illustrates a first embodiment of this invention as applied to a two cycle, crankcase compression type internal combustion engine, indicated generally by the reference numeral 11. The engine 11 includes a cylinder block 12 having a cylinder bore 13 in which a piston 14 reciprocates. A cylinder head 15 is affixed in any known manner to the cylinder block 12 and has a recess 16 that co-acts with the piston 14 and cylinder bore 13 to provide a chamber 17 of volume which varies as the piston 14 reciprocates and in which combustion occurs. A spark plug 18 is provided at the cylinder head 15 so as to fire the charge in the chamber 17 at the appropriate time. The engine 11 has a crankcase 19. The crankcase 19 and the underside of the piston 14 also form a chamber of variable volume as the piston 14 reciprocates. An exhaust passage 21 is provided in the cylinder block 12 and terminates at an exhaust port 22 which communicates with the bore 13 so as to permit the exhaust of combustion products from the chamber 17 as is well known with this type of engine.

An intake passage 23 is formed in the cylinder block 12 and terminates in a intake port 24 which is valved by the operation of the piston 14 so as to selectively admit an intake charge to the crank case 19. This charge is compressed in the crankcase 19 during downward movement of the piston 14 and is transferred through any known manner, which may include scavange passages 25, to the chamber 17. A reed valve 26 is provided in the intake passage 23 so as to assist in flow control. Although a ported arrangement is described, it is to be understood that the invention is equally susceptible to use in sleeve valve engines.

A carburetor 27 is fed with air from an air cleaner (not shown) and supplies a fuel air charge to the intake passage 23 via a spacer 28. The carburetor 27 has a throttle valve 29 so as to control the charge delivered to the engine 11.

When the engine 11 is operating at low to medium speeds or when the throttle valve 29 is less than half open and the engine speed is low, the closure of the port 24 by the piston 14 will have a tendency to cause the intake charge downstream of the throttle valve 29 to be abruptly stopped from movement. The inertia of this relatively immobile charge must be overcome during initial reopening of the port 24. As the speed of the engine increases, or the opening of the throttle valve 29 is more than one half, the charging efficiency of the engine is not impaired. At lower speeds and throttle openings, however, there is less of intake charging efficiency.

To offset the aforenoted disadvantages, the spacer 28 is provided with a small diameter pipe 31 which is in communication with the intake passage 23 through an opening 32. The pipe 31 and a the closed ended tube 33 that is connected to the pipe 31 form a closed, branch passage, indicated generally by the reference numeral 34, which provides a volume that may flow into the intake passage 23 during the intake cycle and into which the intake charge may flow when the intake port 24 is closed. Thus, the branch passage 34 provides a device whereby the flow of intake charge may be continued even when the port 24 is closed so as to overcome the inertia to the flow of this charge during the next intake cycle when the port 24 is open. The branch passage 34 thus acts as a surge tank so as to even out the flow through the parts of the intake passage downstream of the throttle valve 29,, which is particularly effective at lower speeds and and throttle openings as aforenoted.

In a preferred embodiment of the-invention, the capacity of volume preferred by the branch passage 34 should be at least and preferably larger than one sixth of the total volume of the intake passage between the throttle valve 29 and the port 24. It is also desirable to provide the volume of the branch passage 34 so that it is at least equal to one tenth of the volume of the intake passage between the throttle valve 29 and the branch passage opening 32.

Figure 2:
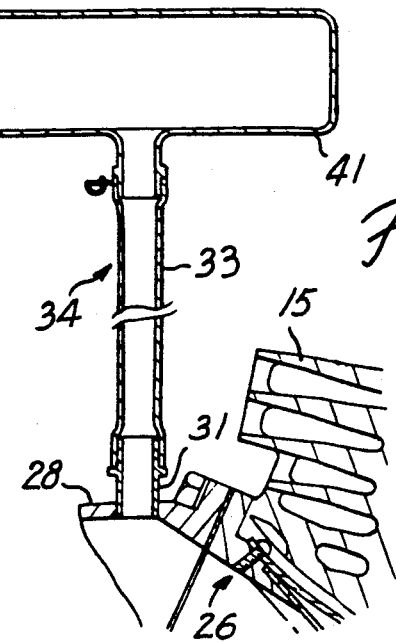
FIG. 2 is a partial cross-sectional view, in part similar to FIG. 1, showing a further embodiment of the invention.

FIG. 2 illustrates another embodiment of the invention. In this embodiment only the configuration of branch passage is changes and for that reason only that portion of the structure will be described. The remaining parts of the emgine are the same as in the preceding embodiment and, for that reason, have been identified by the same reference numerals and will not be described again in detail. In this embodiment, the length of the pipes 31 and 33 may be shortened through the use of a plenum chamber indicated by the reference numeral 41, The plenum chamber 41 is in communication with the pipe 33 but is itself closed. By providing the plenum chamber, 41 as has been noted the length of the pipes 31 and 33, or either of them, may be shortened so as to facilitate installation of the engine in the vehicle and to offer a wider latitude in design. Rather than providing the plenum chamber 41 as illustrated, the same or similar effects may be achieved by the provision of a plurality of branch passages 34 each communicating with the intake passages.

The charge which flows from the branch passage 34 into the intake passage 23 during the induction cycle will flow at the relatively high velocity. For this purpose the length of the branch passage 34 should be at least equal to the diameter of the opening 32. Also the effective cross-sectional area of the opening 32 should be less than me quarter of the effective cross-sectional area of the intake passage 32. This will insure high velocity and will induce turbulence in the intake charge.

Figure 3:
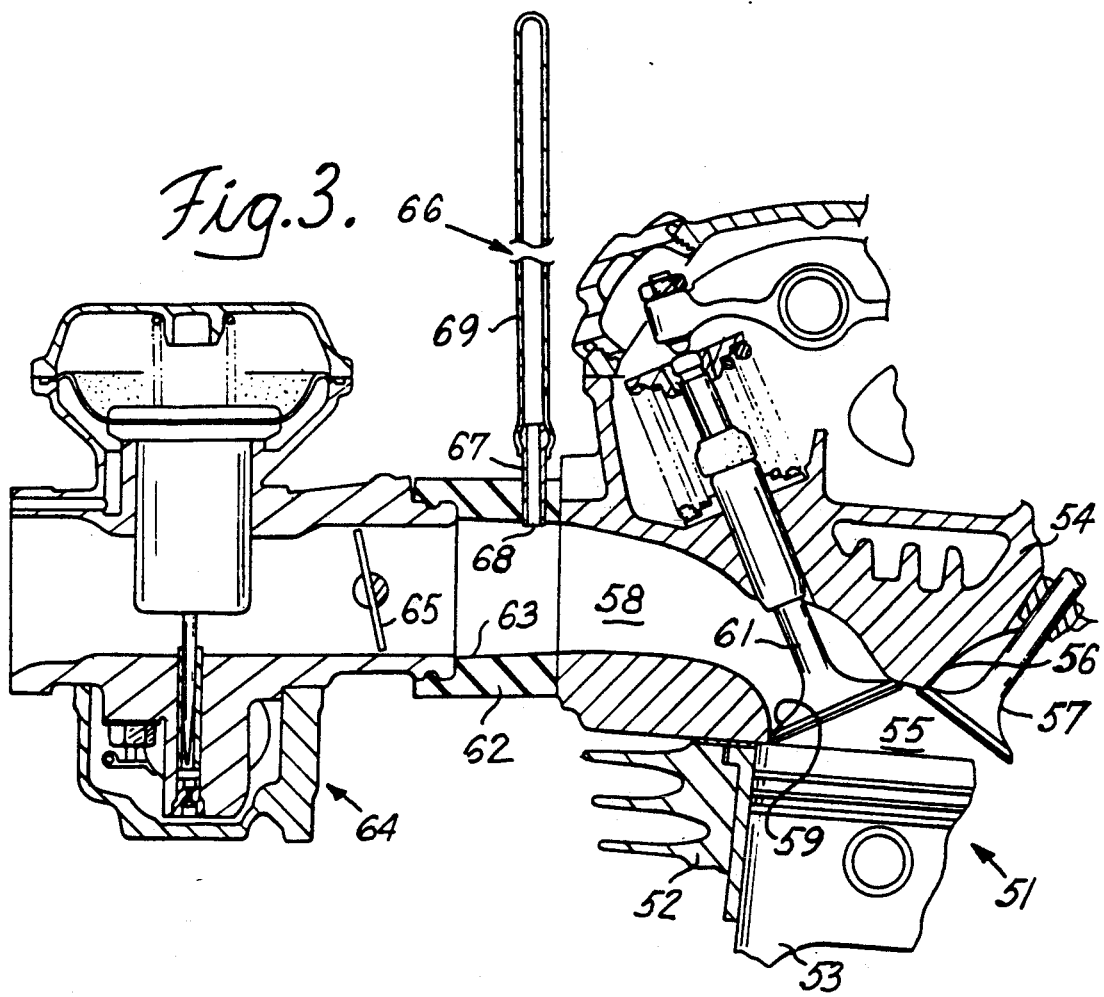
FIG. 3 is a partial cross-sectional view, taken through a single cylinder of a four-cycle engine, constructed in accordance with an embodiment of the invention.

FIG. 3 illustrates the applications of the principle of the invention to a four-stroke engine. Such an engine is identified generally by the reference numeral 51, and includes a cylinder block 52 having a cylinder bore in which a piston 53 is supported for reciprocation. A cylinder head 54 is affixed to the cylinder block 52 in any known manner and has cavity 55 which cooperates to the cylinder bore and piston 53 to form a chamber of variable volume.

An exhaust passage 56 is formed in the cylinder head 54 adjacent to the cavity 55. An exhaust valve 57 controls the communication between the cavity 55 of the exhaust passage 56 so that spent combustion products may be exhausted from the chamber 55.

On the side opposite the exhaust passage 56 the cylinder head 54 is formed with an intake passage 58 which terminates at an intake port 59 in communication with the chamber 55. An intake valve 61 controls the opening and closing of the port 59 so as to control the intake charge delivered to the chamber 55. A spacer 62 is juxtaposed to the cylinder head 54 and has a passage 63 in communication with the inlet end of the cylinder head intake passage 58.

A carburetor, indicated generally by the reference numeral 64, delivers a fuel air charge to the spacer passage 63 and the cylinder head intake passage 58. A throttle valve 65 in the carburetor 64 controls the flow through the induction system.

As with the previously described embodiments, when the throttle valve 65 is less than half open and the engine is ruining at relatively low speed, the inertia of the intake charge between the throttle valve 65 into the intake port 59 causes a decrease in induction efficiency. In order to cure this problem, a branch passage 66 is provided. The branch passage 66 includes an inlet pipe 67 carried by the spaces 62 and having an opening 68 in communication with the spacer intake passage 63. A closed ended tube 69 is connected to the pipe 67 so as to provide a greater volume which is in communication with the main intake passage. The dimension and location of the branch passage 66 and the size of the opening 68 may be determined by the proportions previously suggested.

During the intake cycle, when the valve 61 commences its opening, the charge will be delivered to the chamber 55 both from the branch passage 66 and the main intake passage downstream of the throttle valve 65. When the valve 61 closes, even at low speeds, a flow will still pass the throttle valve 65 to recharge-the volume provided by the branch passage 66. Thus, a continued flow inertia is provided that will improve intake efficiency. Also, the flow from the opening 68 will be at a high velocity so as to increase turbulence in the intake charge.

Figure 4:
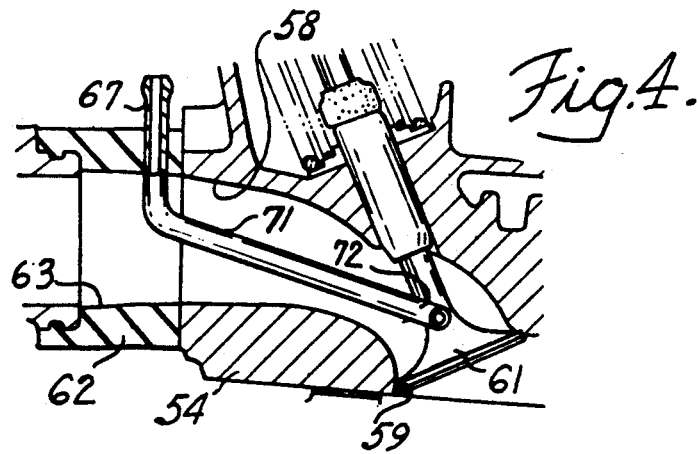
FIG. 4 is a partial cross-sectional view, in part similar to FIG. 3, showing a further embodiment of the invention.

FIG. 4 shows another embodiment of the invention wherein the intake turbulence flowing from the branch passage is used so as to provide a desired flow pattern directly in the chamber of the engine. In many respects this embodiment is the same as the embodiment of FIG. 3. For this reason, components which are the same will not be described again and have been identified by the same reference numerals in the drawing.

In conjunction with the embodiment of FIG. 4, an extension pipe 71 is connected to the branch passage pipe 67 and extends from the spacer 63 through the cylinder head intake passage 58 to a discharge end 72 which is justaposed to the main intake port 59. The opening 72 and pipe 71 are disposed at a point offset from the center of the cylinder bore so as to induce a swirl in the charge entering the chamber from the branch passage. This has been found to improve combustion efficiency. Also, the advantages of providing the flow inertia even at low speed and low throttle openings of the previously described embodiments is also maintained. It should be noted that in this embodiment the branch passage pipe 69 has not been illustrated but is nevertheless employed.

Figure 5:
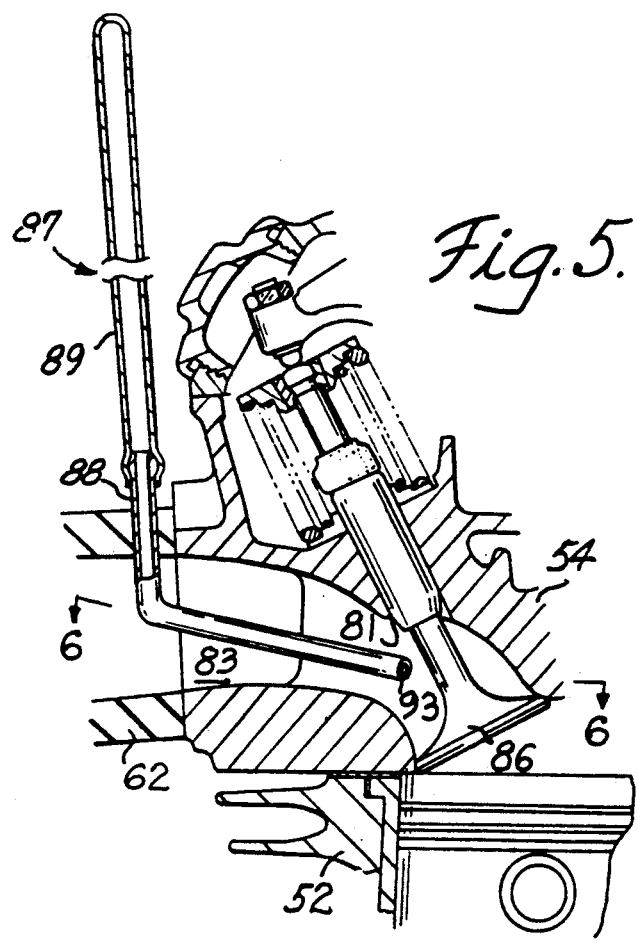
FIG. 5 is a partial cross-sectional view, in part similar to FIGS. 3 and 4, showing a still further embodiment of the invention.
Figure 6:
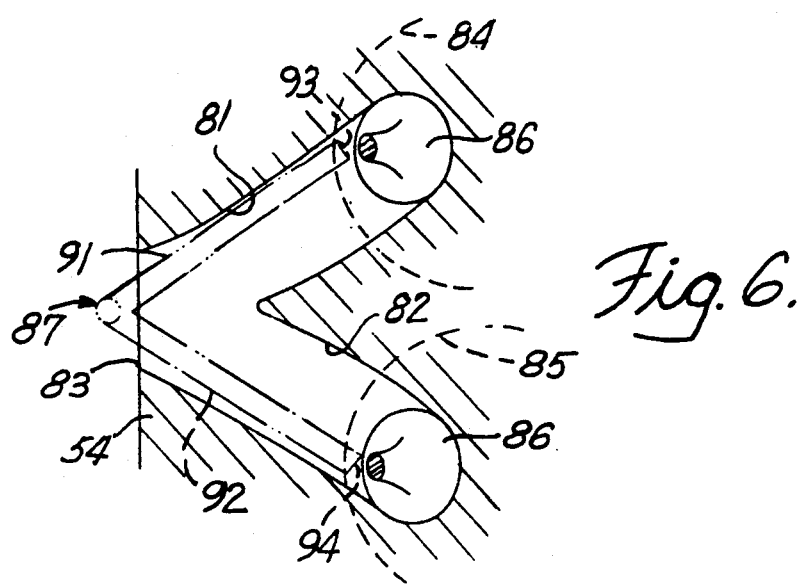
FIG. 6 is a cross-sectional view taken along the line 6—6 of FIG. 5.

In all of the embodiments thus far described, one throttle valve has been positioned in each intake passage. It is to be understood, however, that this invention may also be used in conjunction with arrangements wherein a single throttle valve controls the flow through a number of branched intake passages. Such an embodiment is shown in FIGS. 5 and 6. In conjunction with this embodiment, the parts of the engine which are the same as those previously described will not be repeated. Only those parts of the engine which differ from the embodiments thus far mentioned will be described. In conjunction with this embodiment, a single carburetor and throttle valve (not shown) serves a cylinder head intake passage runners 81 and 82 which extend from a common inlet 83 in the side of the cylinder head. The runners 81 and 82 each terminate in intake ports which serve respective cylinders 84 and 85. Intake valves 86 control the flow from the runners 81 and 82 into the cylinder 84 and 85.

In conjunction with this embodiment, a single branch passage, indicated generally by the reference numeral 87, serves both intake runners 81 and 82. The branch passage 87 has a pipe 88 that is in communication with the spacer 62 and which is carried by it. A second pipe 89 in connected to the pipe 88 so as to provide the requisite volume. Pipes 91 and 92 extend from the pipe 88 into the intake passage runners 81 and 82 and terminate in respective ports 93 and 94 which are justaposed to the intake valve 86 of the respective cylinders.

Although the use of the two runners 81 and 82 in conjunction show a single inlet 83 increases the volume downstream of the throttle valve and the flow inertia, the use of the branch passage 87 has an additional effect in improving flow. Furthermore, the location of the outlets 93 and 94 relative to the cylinder bores 84 and 85 can be utilized to obtain the desired flow pattern in the cylinders.

It should be noted that each of the illustrated embodiments provides an arrangement wherein a flow inertia is developed in the intake system which assists in charging efficiency when the throttle valve is less than half opened and the engine is operating at a relatively low speed. Furthermore, the arrangement of the branch passages increases the turbulence in the intake charge and, in some embodiments, carries this increased turbulence over into the chamber of the engine so tit combustion efficiency will be improved. Although several embodiments have been illustrated and described, the principles of the invention may be applied to a wide variety of constructions, as will become readily apparent to those skilled in the art, without departing from the spirit and scope of the invention as defined by the appended claims.

We claim:

1. In an induction system for an internal combustion engine having a chamber of variable volume, an intake passage for delivering a charge to the chamber, said intake passage including a carburetor and a spacer interposed between said carburetor and a body of said engine defining said chamber of variable volume, and throttle valve means for controlling the flow to the chamber through said intake passage, the improvement comprising a branch passage in communication with said intake passage formed in part by a pipe extending through said spacer and positioned between said throttle valve means and said chamber for providing a closed volume in communication with said intake passage for improving induction efficiency, said communication being through a single restricted opening having an effective cross-sectional area less than one fourth of the effective cross-sectional area of the intake passage, the volume defined by said branch passage being at least one sixth of the volume of said intake passage between said throttle valve means and said chamber.

2. An induction system for an internal combustion engine having a chamber of variable volume, an intake passage for delivering a charge to the chamber, said intake passage including a carburetor and a spacer interposed between said carburetor and a body of said engine defining said chamber of variable volume, and throttle valves means for controlling the flow to the chamber through said intake passage, the improvement comprising a branch passage in communication with said intake passage formed in part by a pipe extending through said spacer and positioned between said throttle valve means and said chamber for providing a closed volume in communication with said intake passage for improving induction efficiency, said branch passage and said closed volume being constructed and arranged to experience a reversing flow of charge into and out of said branch passage during the cyclic variation of volume of said chamber, the communication of said branch passage with said intake passage being through a single restricted opening effective to generate turbulence to the charge delivered from said branch passage during the time when said branch passage is discharging a charge into said intake passage, the volume defined by said branch passage being at least one sixth of the volume of said intake passage between said throttle valve means and said chamber.

3. An induction system as set forth in claim 2 wherein the outlet of the branch passage into the intake passage is in close proximity to the point of discharge of the intake passage into the chamber for generating turbulence in said chamber by the flow from said branch passage.

4. An induction system as set forth in claims 1 or 2 wherein the volume of the branch passage is also at least one tenth of the volume of the area of the intake passage between the throttle valve means and the point of discharge of the balance passage into the intake passage.

5. An induction system as set forth in claims 1 or 2 wherein the branch passage further includes a plenum chamber.

6. An induction system as set forth in claims 1 or 2 wherein there are a pair of chambers of variable volume, the intake passage having a pair of runners each leading to a respective of said chambers, the throttle valve means comprising a single throttle valve in a common portion of the intake passage upstream of said runners.

7. An induction system as set forth in claim 6 further including a charge forming device for delivering a fuel air charge to the induction passage, the throttle valve means comprising the throttle valve of the charge forming device.

8. An induction system as set forth in claims 1 or 2 wherein the engine is of the two cycle type and the chamber comprises the crankcase of said engine.

9. An induction system as set forth in claim 8 further including reed valve means interposed in the intake passage between the point of discharge of the branch passage and the chamber.

10. An induction system as set forth in claim 9 wherein the intake passage terminates in a port, the variable volume chamber being defined at least in part by a piston which cooperates with said port for controlling the flow therethrough.

* * * * *